United States Patent [19]
Sachs

[11] Patent Number: 5,829,037
[45] Date of Patent: Oct. 27, 1998

[54] MULTIPROCESSOR SYSTEM HAVING A LARGE NUMBER OF PROCESSOR SYSTEM COMPONENTS CONNECTED TO A PLURALITY OF SERIAL HIGH-SPEED-BUSES

[75] Inventor: Harald Sachs, Hofolding, Germany

[73] Assignee: Siemens Nixdorf Informationssysteme Aktiengesellschaft, Paderborn, Germany

[21] Appl. No.: 976,216

[22] Filed: Nov. 21, 1997

Related U.S. Application Data

[63] Continuation of Ser. No. 733,093, Oct. 16, 1996, abandoned, which is a continuation of Ser. No. 90,324, Jul. 13, 1993, abandoned.

[30]       Foreign Application Priority Data

Aug. 19, 1992  [EP]   European Pat. Off. .............. 92114159

[51] Int. Cl.⁶ .............................. G06F 12/00; G06F 13/00
[52] U.S. Cl. ........................... 711/141; 711/146; 711/150; 395/206
[58] Field of Search .............................. 711/3, 118, 141, 711/146, 150; 395/306, 287

[56]       References Cited

U.S. PATENT DOCUMENTS

| | | | |
|---|---|---|---|
| 4,656,620 | 4/1987 | Cox ............................................ | 370/58 |
| 4,785,396 | 11/1988 | Murphy et al. .......................... | 364/200 |
| 4,794,521 | 12/1988 | Ziegler et al. ........................... | 364/200 |
| 4,837,682 | 6/1989 | Culler ....................................... | 395/294 |
| 5,067,071 | 11/1991 | Schanin et al. .......................... | 395/275 |
| 5,084,836 | 1/1992 | Yamaguchi .............................. | 395/800 |
| 5,113,514 | 5/1992 | Albonesi et al. ......................... | 395/471 |
| 5,191,652 | 3/1993 | Dias et al. ................................ | 395/200 |
| 5,249,283 | 9/1993 | Boland ..................................... | 395/425 |
| 5,265,235 | 11/1993 | Sindhu et al. ........................... | 395/425 |
| 5,345,578 | 9/1994 | Manasse ................................... | 395/425 |
| 5,349,579 | 9/1994 | Madonna et al. ....................... | 370/58.2 |
| 5,361,366 | 11/1994 | Kawano et al. .......................... | 395/800 |
| 5,388,224 | 2/1995 | Maskas .................................... | 395/325 |
| 5,404,460 | 4/1995 | Thomsen et al. ........................ | 395/275 |
| 5,410,654 | 4/1995 | Foster et al. ............................. | 395/275 |
| 5,423,007 | 6/1995 | Feigenbutz et al. ..................... | 395/309 |
| 5,434,993 | 7/1995 | Liencres et al. ......................... | 395/460 |
| 5,455,917 | 10/1995 | Holeman et al. ........................ | 395/287 |
| 5,475,854 | 12/1995 | Thomsen et al. ........................ | 395/800 |
| 5,488,705 | 1/1996 | LaBarbera ............................... | 395/309 |
| 5,519,832 | 5/1996 | Warchol .............................. | 395/183.22 |
| 5,600,803 | 2/1997 | Iitsuka et al. ............................ | 395/287 |

FOREIGN PATENT DOCUMENTS 0347040  12/1989   European Pat. Off. .

OTHER PUBLICATIONS

"Scalable Shared Memory Multiprocessor Architectures" Computer, Jun. 1990, vol. 23, No. 6, pp. 71–73, IEEE Comp. Soc., Wash. D.C.

A Survey of Cache Coherence Schemes for Multiprocessors, Computer IEEE 1990, pp. 12–24.

Serial bus extension boosts VMEbus performance ten–fold, Computer Design, vol. 30, No. 14, Nov. 1991, pp. 26–35.

*Primary Examiner*—Tod R. Swann
*Assistant Examiner*—Tuan V. Thai
*Attorney, Agent, or Firm*—Hill & Simpson

[57]       ABSTRACT

A multiprocessor system has a plurality of serial system buses arranged in parallel to which is connected a large number of system components (PSK1, PSK, SSK). The system components (PSK1, PSKm, SSK) are processor system components (PSK1, PSKm) having cache memories and memory system components. Every system component (PSK1, PSKm, SSK) is connected to every serial system bus. The processor system components (PSK1, PSKm) have the capability for maintaining the consistency of the contents of the cache memories for every serial high-speed bus (SB1, SBn-1, SBn).

4 Claims, 1 Drawing Sheet

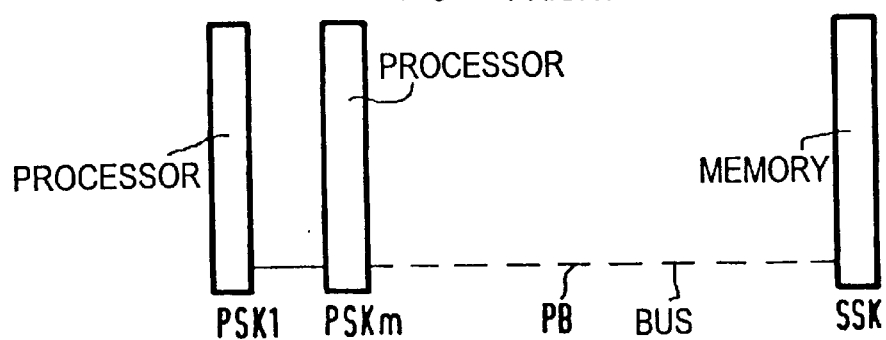
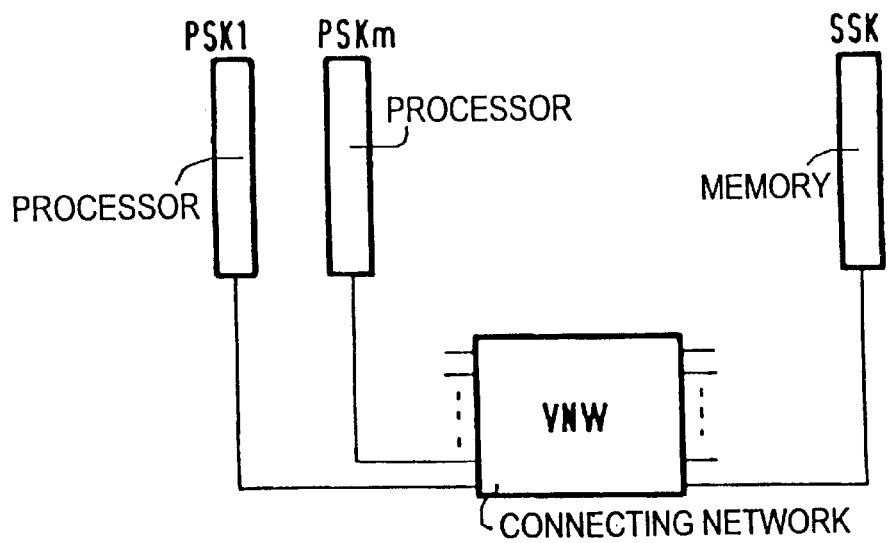
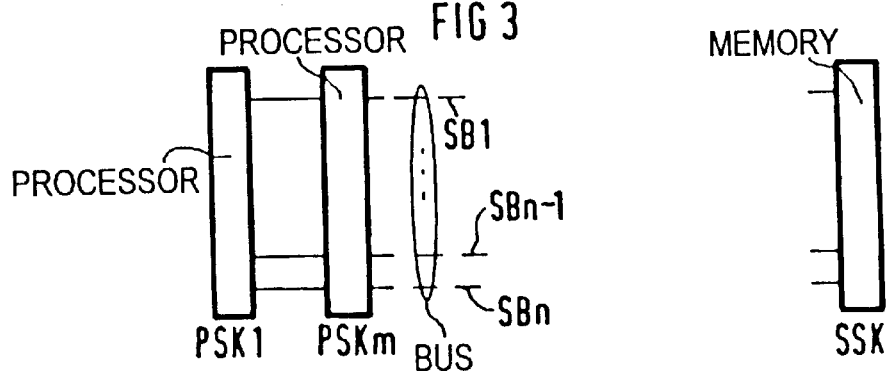

MULTIPROCESSOR SYSTEM HAVING A LARGE NUMBER OF PROCESSOR SYSTEM COMPONENTS CONNECTED TO A PLURALITY OF SERIAL HIGH-SPEED-BUSES

This is a continuation, of application Ser. No. 08/733,093 filed Oct. 16, 1996 abandoned, which is a continuation of Ser. No. 08/090,324 filed Jul. 13, 1993 abandoned.

BACKGROUND OF THE INVENTION

The present invention is directed to a multiprocessor system.

In a currently standard class of closely coupled multiprocessors, all processors and all main memory blocks are connected to a high-performance parallel system bus. All memory accesses are implemented via this bus. For example, such buses have 60 to 120 lines.

The parallel system bus makes it possible for the cache memories of the processors to be kept consistent without great outlay. Since all memory accesses occur via this one bus that is accessible to all processors, every processor can track the access of another processor. Various cache memory consistency protocols are based on this general visibility of the system bus operations. For example, "snoopy" cache protocols are known from Computer, IEEE, 1990, pages 12–24.

The disadvantage of a central parallel bus is that the central bus becomes a bottleneck for the system beyond a prescribed plurality of processors. Simply increasing the number of processors no longer results in enhanced performance for the processor system. In order to obtain enhanced performance, it is known to utilize complex connection networks for connecting the system components. However, in these networks the memory accesses of an individual system component can no longer be observed by each of the other system components. As a result, consistency protocols that are based on "directories" must be used. However, such consistency protocols are complicated to implement and quite substantially diminish the system performance.

In addition to parallel buses, serial high-speed buses are also well known in the prior art. A serial high-speed bus named "Autobahn" is disclosed in Elektronik, No. 22, 1991, pages 30–32.

SUMMARY OF THE INVENTION

It is an object of the present invention to provide a multiprocessor system that allows the use of an optimally large plurality of system components given a minimum plurality of required bus lines. Simultaneously, the condition of consistency of the cache memories contained in the system is met in a simple manner.

This object is inventively achieved by a multiprocessor system having a system bus and system components connected thereto that are partly composed of processor system components having cache memories that contain means for maintaining the consistency of the contents of the cache memories given memory accesses ensuing via the system bus. The system bus has a plurality of serial high-speed buses arranged in parallel to which the system components are respectively connected. The processor system components respectively have means for maintaining the consistency of the contents of the cache memories for every serial high-speed bus. Thus, a large number of system components can be operated given a minimum plurality of bus lines.

Further, the condition is met of maintaining the consistency of the contents of the cache memories contained in the system. This is simply accomplished because the simple and especially effective consistency protocols of the single-bus solution can be transferred onto a large multiprocessor having a plurality of serial high-speed buses that are arranged in parallel. As a result complex connecting networks are not necessary.

In an advantageous development of the present invention the means for maintaining the consistency of the contents of the cache memories of the processor system components are formed by equipment that operates according to the "snoopy" principle.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 1 and 2 schematically depict exemplary embodiments of a multiprocessor system of the prior art; and FIG. 3 schematically depicts an exemplary embodiment of a multiprocessor system of the present invention.

DESCRIPTION OF THE PREFERRED EMBODIMENT

The multiprocessor system shown in FIG. 1 is a single-bus multiprocessor system. It is composed of a plurality of system components such as a first processor system component PSK1, by an $m^{th}$ processor system component PSKm and by a memory system component SSK. Various combinations with a plurality of memory system components and further processor system components are conceivable. The processor system components PSK1, PSKm contain cache memories.

The system components are connected to one another by a central parallel bus PB. The bus arbitration and the data exchange between the system components ensue via the central parallel bus PB. The processor system components PSK1, PSKm can have processors or processor clusters. From ten to thirty of the processor system components PSK1, PSKm can be connected to the parallel bus PB. However, when further processor system components are connected, the central parallel bus PB becomes a bottleneck for the system.

A second multiprocessor system is depicted in FIG. 2 with the same system components as in FIG. 1. In this multiprocessor system, however, the connections of the individual system components PSK1, PSKm, SSK to one another are accomplished by a connecting network VNW. Although the connecting network VNW enables the connection of a plurality of processor system components that is greater than thirty, it eliminates a transmission channel from the remaining connection possibilities. However, memory accesses by all processor system components PSK1, PSKm can no longer be observed without further measures. Also, the condition of maintaining the consistency of the cache memories contained in the system can no longer be met in a simple way.

FIG. 3 shows a multi-bus multiprocessor system that again has the same system components as in FIGS. 1 and 2. Instead of the parallel bus PB of FIG. 1 or the connecting network VNW of FIG. 2, a plurality of serial high-speed buses SB1, SBn-1, SBn are employed in a parallel arrangement. The various system components PSK1, PSKm, respectively simultaneously connected to all serial high-speed buses SB1, SBn-1, SBn. For example, the serial high-speed buses SB1, SBn-1, SBn can be the serial high-speed bus "Autobahn". The serial high-speed buses SB1, SBn-1, SBn have a transmission rate above four gigabits/sec. As in the case of a parallel bus, ten to thirty processor system components PSK1, PSKm can be connected. When, for example, twenty such serial high-speed buses are provided, multiprocessor systems can be constructed having 200 through 600 processor system components.

When a strategy similar to a "local area network" such as, for example, token bus "IEEE 802.4" or CSMA/CD (carrier sense multiple access/collision) is employed for bus arbitration, only two lines are required for a bus. This means that only forty bus lines are needed for twenty serial high-speed buses. CSMA/CD is a specific technique for enabling a plurality of transmitters, that require simultaneous use of a bus, to successively use the bus by listening at the bus and waiting or by delayed retransmission given "collisions".

In other arbitration strategies, a further two-wire arbitration bus is required for every serial two-wire transmission bus. Although the number of required wires doubles to four in comparison to the above solution, this number is still sufficiently low as compared to the size of the multiprocessor system to be constructed.

The individual processor system components PSK1, PSKm can keep their cache memories consistent without further measures via a consistency protocol designed for serial single-bus solutions, for example a consistency protocol that operates according to a "snoopy" principle. This protocol provides that memory accesses can be observed by all processor system components PSK1, PSKm. To this end, each of the processor system components PSK1, PSKm have a means that operates according to the "snoopy" principle for every serial high-speed bus.

The advantage of being able to construct a fault-tolerant multiprocessor system also derives due to the parallel arrangement of a plurality of serial high-speed buses. Namely, faulty connecting paths can be very easily bypassed.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A multiprocessor system for a large number of processor components being composed of more than 100 processor units, said multiprocessor system having a system bus and system components for data processing operations directly connected thereto, at least some of the system components being said processor components, said processor components having cache memories and having means for maintaining consistency of contents of the cache memories of the processor components, wherein said system bus having a plurality of serial high-speed buses arranged in parallel;

each of the system components being directly connected to each of the plurality of serial high-speed buses, and each of the processor components having means for maintaining consistency of contents of the cache memories for every serial high-speed bus given memory accesses that occur via the system bus, the system bus consisting of only serial high-speed buses;

wherein said miltiprocessor system further comprises
   (a) a snoopy cache protocol and wherein the means for maintaining the consistency of the contents of the cache memories of the processor components operate according to the snoopy cache protocol; and
   (b) an N-wire arbitration bus having bis arbitration mechanism for arbitrating accesses to said plurality of serial high-speed buses amongst said plurality of processors unit.

2. A multiprocessor system having a large number of processor units, comprising:

a plurality of processor units, said plurality of processor units being composed of more than 100 processor units, each processor unit of said plurality of processor units having a cache memory;

system bus for data processing operations directly connected to each processor unit of said plurality of processor units, said system bus having only a plurality of serial high-speed buses arranged in parallel, each processor unit of said plurality of processor units being directly connected to each of said plurality of serial high-speed buses; and each processor unit of said plurality of processor units having a cache memory consistency protocol for maintaining consistency of contents of said cache memories given memory accesses that occur via said system bus, the system bus consisting only serial high-speed buses;

wherein said cache memory consistency protocol is a snoopy cache protocol, and each processor unit of said plurality of processor unit has mean for maintaining consistency of contents of the cache memories for every one of said plurality of serial high-speed bus; and wherein said multiprocessor system further comprises an N-wire arbitration bus having bus arbitration mechanism for arbitrating accesses to said plurality of serial high-speed buses amongst said plurality of processors units.

3. The multiprocessor system according to claim 2, wherein the multiprocessor system further comprises at least one memory component that is connected to said plurality of serial high-speed buses.

4. A multiprocessor system having a large number of processor units, comprising:

a plurality of processor units, said plurality of processor units being composed of more than 100 processor units, each processor unit of said plurality of processor units having a cache memory;

a system bus for data processing operations directly connected to each processor unit of said plurality of processor units, said system bus having only a plurality of serial high-speed buses arranged in parallel, each processor unit of said plurality of processor units being directly connected to each of said plurality of serial high-speed buses that have a transmission rate greater than four gigabits/sec;

at least one memory component that is connected to said plurality of serial high-speed buses;

each processor unit of said plurality of processor units having a cache memory consistency protocol for maintaining consistency of contents of said cache memories given memory accesses that occur via said system bus, the system bus consisting of only serial high-speed buses;

wherein Raid cache memory consistency protocol is a snoopy cache protocol and wherein each processor unit of said plurality of processor units has means for maintaining consistency of contents of the ;cab memories, for every high-speed his;

wherein said multiprocessor system further comprises an N-wire arbitration bus having bis arbitration mechanism for arbitrating accesses to said plurality of serial high-speed buses amongst said plurality of processors units.

* * * * *